United States Patent Office 2,936,275
Patented May 10, 1960

2,936,275

RADIOCHEMICAL TREATMENT OF DRYING OILS

Isidor Kirshenbaum, Union, Anthony H. Gleason, Westfield, and Vincent L. Hughes, Clark Township, Union County, N.J., assignors to Esso Research and Engineering Company, a corporation of Delaware No Drawing. Application July 2, 1956
Serial No. 595,051

1 Claim. (Cl. 204—158)

The present invention relates to a method of bodying or treating oily polymeric drying oils by irradiation. More particularly, it proposes an improved method of treating polymeric drying oils which comprises admixing an air blown drying oil with an oil-soluble heavy metal soap, and irradiating the resulting mixture with high intensity ionizing radiation, preferably gamma rays.

In brief compass this invention proposes a method of treating the oily polymers or drying oils obtained by the polymerization of conjugate diolefins, or by the copolymerization of conjugate diolefins with vinyl aromatics. Such a drying oil is treated by first air blowing the oil, then admixing it with an activating amount of an oil-soluble heavy metal soap, and irradiating the mixture with gamma rays and/or neutrons. In a much preferred embodiment of this invention, the reaction temperature during irradiation is maintained below 150° F.

Drying oils have been prepared by polymerizing mixtures of the monomers involved, usually styrene and butadiene, at temperatures of 77° to 212° F. in the presence of alkali metal catalysts, such as sodium. It is also known to make these oily polymers by exposing the reactants to high intensity ionizing radiation.

It is often desirable to further treat the drying oils so obtained, or to body them, so as to impart improved characteristics such as lessening of drying time when in use and improving film properties. The present invention is concerned with an efficient method for bodying or increasing the viscosity of drying oils. In this method a heavy metal soap is added to the oil, and the resulting admixture is irradiated with high intensity ionizing radiation.

The drying oil feed stock of this invention is, after being formed, first pretreated by air blowing or oxidation, such that it has an oxygen content above 7.0 wt. percent. It is essential that the drying oil be so pretreated before being irradiated in order to obtain the improved results of this invention.

More particularly, the drying oil irradiated according to this invention has a viscosity in the range of 1.0 to 50 poises at 77° F. at a concentration of 50% in xylene, and an oxygen content above 7.0 wt. percent. The material is obtained by air blowing the reaction product of conjugate diolefins or of conjugate diolefins and vinyl aromatics.

Typical diolefins used to prepare the drying oil are butadiene, isoprene, dimethylbutadiene, piperylene and methylpentadiene. Typical vinyl aromatics are styrene, paramethylstyrene, dimethylstyrene, diethylstyrene and the like. Normally these materials are reacted in the proportion of 60 to 100 parts by weight of conjugate diolefins and 0 to 40 parts by weight of vinyl aromatics. A particularly suitable oil feed stock is prepared by irradiating a mixture of 80 parts of butadiene-1,3 and 20 parts of styrene.

The preparation of the oily polymeric feed stock of this invention may be carried out using suitable solvents such as butane, benzene, cyclohexane, xylene, Solvesso, Varsol or, generally, hydrocarbons which remain liquid under the conditions employed, and catalysts such as finely divided metallic sodium, or organic peroxides and hydroperoxides. Reference is made to U.S. 2,672,425 for suitable methods of preparing the drying oils, and other suitable solvents and catalysts.

The products so obtained by the above reaction are then blown with air, or other free oxygen containing gas, thereby being partly oxidized. While the heavy metallic soap can be added to the drying oil before air blowing, it is preferred to add it after air blowing. This air blowing is preferably carried out at a temperature in the range of 150° to 300° F., preferably in the presence of about 0.01 to 0.1 wt. percent of Mn, Co, Fe soaps as oxidation catalysts, and for a time sufficient to incorporate at least 7 wt. percent oxygen in the oily polymer. The polymer from this treating step is then treated according to the method of this invention.

The method of this invention comprises adding to the air blown oil an oil-soluble heavy metal soap and irradiating the mixture at a temperature below 150° F. The metals that are used according to this invention are lead, cadmium, mercury, bismuth, tungsten, and mixtures thereof. The metals exist preferably as oil-soluble metal soaps. Thus the metals may be in the form of napthenates, oleates, the soaps of $C_8$-$C_{13}$ organic acids including oxo acids, and mixtures thereof. Also, suspend soaps as a slurry in the reaction mixture can be used. An amount of this heavy metal soap is admixed with the air blown oily polymer sufficient to incorporate 0.1 to 10 wt. percent, preferably 0.2 to 2 wt. percent of the metal per se into the admixture. If desired, the admixture can also be diluted with suitable solvents, e.g., as above described, during the irradiation treatment. Preferably the admixture contains 25 to 75 wt. percent of a solvent.

The admixture of air blown oily polymer, heavy metal soap, and solvent is then exposed to high intensity ionizing radiation. This can be done either batchwise or continuously. The radiation is preferably gamma rays. The radiation can be obtained from artificial accelerators, nuclear waste products such as spent fuel elements, or products especially made radioactive by insertion in a nuclear reactor such as cobalt 60. In this form of the invention, it is preferred that the average gamma ray flux in the reaction zone be better than 300,000 roentgens/hr. It is also preferred that the conditions be such that the admixture receive at least one megaroentgen of gamma ray irradiation, preferably under 80 megaroentgens. While the temperature may vary, it is preferred to maintain the temperature below 150° F. during this treatment. The pressure can be essentially atmospheric, or at least sufficient to maintain substantially liquid phase conditions.

In some situations, it is preferred to use a nuclear reactor such as an atomic pile as the radiation source. Generally speaking, a much higher level of irradiation is obtainable and thus the radiation time can be reduced. In this embodiment of the invention, it is preferred that the neutron flux in the reaction zone be on the average above about $10^{12}$ neutrons/cm.$^2$/sec. The conditions are such, preferably, that the admixture receives at least 0.01 kwh./lb. of irradiation, preferably above about 0.1 kwh./lb.

When using a nuclear reactor, the polymeric oil and heavy metal soap mixture is simply pumped through pipes disposed in or around the fissionable material. Conventional moderators such as carbon or water are used to obtain the proper ratio of thermal neutrons to fast neutrons. In some cases, the hydrocarbon reactant can serve as a moderator.

When using a nuclear reactor, it is preferred that the feed stock be substantially free from materials that become radioactive under neutron bombardment, or at least that the concentration of such material be such that only a very little radioactivity is induced.

After irradiation, the irradiated oily polymer is withdrawn and further treated as desired. This further treatment can include means to remove impurities such as the added heavy metal soap, and means to remove any induced radioactivity such as distillation, filtration, washing with water or organic solvents, ion exchange, settling, and storage.

The advantage of this invention is that the curing of the drying oil is greatly accelerated. The curing reaction is also readily controlled because of the low treating temperature.

EXAMPLE

Air blown polybutadiene containing about 9% oxygen and having a viscosity of 3 poises at 50% NVM (non-volatile matter) at 77° F., was irradiated for 64 hours in the presence of gamma radiation from a cobalt 60 source. The gamma ray flux in the reaction zone was 1.2 megaroentgens/hr. One sample contained no additive and the other contained 1% lead as lead naphthenate. The samples during irradiation, were diluted with 50% of Solvesso 100 (a mixture of trimethylbenzenes and ethyl toluenes). Twenty grams of each sample were irradiated in unvented glass bottles.

The following table gives the results of these experiments.

Table 1

|  | Sample w./o. Additive | | Sample with Additive | |
|---|---|---|---|---|
| Irradiated | No | Yes | No | Yes |
| Product Viscosity, poise @ 25° C | 3.1 | 9.8 | 3.2 | 11.8 |

As shown by the above data, the presence of a heavy metal, oil-soluble soap substantially increases the bodying rate as evidenced by the change in viscosity. The viscosity change or degree of bodying is probably a measure of the extent of cross-linking within the polymeric material.

Having described this invention, what is sought to be protected by Letters Patent is succinctly set forth in the following claim.

What is claimed is:

A method for bodying a polybutadiene drying oil, said oil having an oxygen content of about 9 wt. percent and a viscosity of about 3.0 poises at 50% non-volatile matter as measured in xylene at 77° F. which comprises subjecting said polybutadiene in admixture with lead naphthenate in an amount equivalent to about 1 wt. percent lead to gamma radiation for a total dosage of 1 to 80 megaroentgens.

References Cited in the file of this patent
UNITED STATES PATENTS

| | | |
|---|---|---|
| 1,818,073 | Long | Aug. 11, 1931 |
| 2,586,594 | Arundale et al. | Feb. 19, 1952 |